(12) United States Patent
Ruthenberg et al.

(10) Patent No.: US 11,401,574 B2
(45) Date of Patent: Aug. 2, 2022

(54) METHOD FOR PRODUCING A STEEL COMPONENT PROVIDED WITH A COATING, AND STEEL COMPONENT

(71) Applicants: ThyssenKrupp Steel Europe AG, Duisburg (DE); thyssenkrupp AG, Essen (DE)

(72) Inventors: Manuela Ruthenberg, Dortmund (DE); Maria Koyer, Dortmund (DE)

(73) Assignee: thyssenkrupp AG, Essen (DE)

( * ) Notice: Subject to any disclaimer, the term of this patent is extended or adjusted under 35 U.S.C. 154(b) by 176 days.

(21) Appl. No.: 16/624,555

(22) PCT Filed: Jun. 19, 2018

(86) PCT No.: PCT/EP2018/066264
§ 371 (c)(1),
(2) Date: Dec. 19, 2019

(87) PCT Pub. No.: WO2019/002026
PCT Pub. Date: Jan. 3, 2019

(65) Prior Publication Data
US 2021/0155997 A1 May 27, 2021

(30) Foreign Application Priority Data
Jun. 29, 2017 (DE) ...................... 10 2017 211 076.7

(51) Int. Cl.
*C21D 9/46* (2006.01)
*B32B 15/01* (2006.01)
(Continued)

(52) U.S. Cl.
CPC ............. *C21D 9/46* (2013.01); *B32B 15/012* (2013.01); *C21D 1/18* (2013.01); *C21D 1/673* (2013.01);
(Continued)

(58) Field of Classification Search
None
See application file for complete search history.

(56) References Cited

U.S. PATENT DOCUMENTS 5,015,341 A * 5/1991 Guzzetta ................. C25D 5/48
148/518
2010/0086002 A1 4/2010 Hwang et al.
(Continued)

FOREIGN PATENT DOCUMENTS

DE 102009014670 A1 9/2010
EP 1380666 A1 1/2004
(Continued)

OTHER PUBLICATIONS

Andritz (Hot Dip Galvanizing Line No. 5, 2009) (Year: 2009).*
(Continued)

*Primary Examiner* — Robert S Jones, Jr.
*Assistant Examiner* — Jiangtian Xu
(74) *Attorney, Agent, or Firm* — RMCK Law Group PLC

(57) ABSTRACT

The invention relates to a method for producing a steel component by forming of a flat steel product coated with an anticorrosion coating, and to a steel component produced from a steel substrate coated with anticorrosion coating. The steel component is produced by providing a flat steel product coated with an aluminum-based anticorrosion coating, heat-treating a blank formed from the coated flat steel product, in a furnace, where $0.0034°$ C./min$\leq Q \leq 0.021°$ C./min, with $Q=(T*d)/(t*L)$, T=furnace temperature in ° C., d=blank thickness in mm, t=dwell time of the blank in the furnace in min, L=furnace length in m, and shaping the blank in a shaping tool. The steel component comprises a steel substrate and, at least on one side of the steel substrate, an anticorrosion coating which comprises at least one first and one second silicon-rich layer (Si1, Si2) and also one first and one second low-silicon layer (A, B), where the quotient X (Continued)

formed from the thickness (dB) of the second low-silicon layer (B) in μm by the thickness (dA) of the first low-silicon layer (A) in μm is at least 0.4 and at most 1.1.

15 Claims, 1 Drawing Sheet

(51) Int. Cl.
| | |
|---|---|
| *C21D 1/18* | (2006.01) |
| *C21D 1/673* | (2006.01) |
| *C21D 6/00* | (2006.01) |
| *C22C 21/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C23C 2/12* | (2006.01) |
| *C23C 2/28* | (2006.01) |
| *C23C 2/40* | (2006.01) |

(52) U.S. Cl.
CPC .............. *C21D 6/005* (2013.01); *C21D 6/008* (2013.01); *C22C 21/02* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/12* (2013.01); *C23C 2/28* (2013.01); *C23C 2/40* (2013.01)

(56) References Cited

U.S. PATENT DOCUMENTS

| | | | |
|---|---|---|---|
| 2011/0283851 A1 | 11/2011 | Overrath et al. | |
| 2015/0344986 A1 | 12/2015 | Hwang et al. | |
| 2017/0260601 A1* | 9/2017 | Banik | C21D 8/0205 |
| 2019/0276912 A1* | 9/2019 | Drillet | C23C 2/26 |
| 2019/0376745 A1* | 12/2019 | Lopez Lage | F27D 3/026 |

FOREIGN PATENT DOCUMENTS

| | | |
|---|---|---|
| EP | 2242863 A1 | 10/2010 |
| EP | 2993248 A1 | 3/2016 |
| EP | 2086755 B1 | 11/2017 |
| WO | 2008053273 A1 | 5/2008 |
| WO | 2010085983 A1 | 8/2010 |
| WO | 2015061911 A1 | 5/2015 |

OTHER PUBLICATIONS

Paints and varnishes—Determination of stone-chip resistance of coatings—Part 1—DIN EN ISO 20567-1, 2017.
Testing and Documentation Guideline for the Joinability of thin sheet of steel—Part 2: Resistance Spot Welding, SEP-1220-2, 2011.
Testing and Documentation Guideline for the Joinability of Thin Sheet of Steel—Part 5: Gas Metal Arc Welding, SEP 1220, 2019.
D1: "Flexible Heat Treatment for Controlled Configuration of Component Properties and for Increasing Energy Efficiency in the Hot Forming Process Chain (FlexWB)", BMBF Strategic Project, Jun. 1, 2009-Nov. 30, 2012.
D10: Data Register Excerpt of Fraunhofer concerning FlexWB, 2014.
D2: Dissertation of Mr. Tobias Vibrans "Inductive Heating of Mould Blanks for Hot Forming", 2016.
D4: Dong Wei Fan et.al., „State-of-the-Knowledge on Coating Systems for Hot Stamped Parts, 2012.
D7: TKSE Product Brochure of "TRIBOND—High Strength and High Ductility" Oct. 2015.
D8: Data Sheet 22MnB5 of Salzgitter Flachstahl, Jan. 2014.
German Opposition of VW Aktien-gesellschaft in DE Application No. 10 2017 211 076.7 dated Dec. 13, 2019.
International Search Report and Written Opinion for International Application No. PCT/EP2018/066264 dated Aug. 2, 2018.
Usinor Automotive Steel Products Catalogue, Usibor.
Consolidated List of Citations—German Opposition Proceedings—EP18733832.2.
D13—Product Brochure of ThyssenKrupp Steel Europe AG, Mangan-Bor-Stähle MBW, 2022.
D20—Website Excerpt of www.monarch.qucosa.de, 2016.
D6a—Jhajj, K. "Heat Transfer Modeling of Roller Hearth and Muffle Furnace", University of Waterloo Master's Thesis, 2015.
D6B—Proof of the Publication Date of D6a supplied by the University of Waterloo, 2020.
D9—Galvanisation et aluminiage en continu, techniques de l'ingenieur, Apr. 10, 1996.
Kolleck, R. et.al., "Investigation on Induction Heating for Hot Stamping of Boron Alloyed Steels"—CIRP-Annals—Manufacturing Technology 58 (2009).

* cited by examiner

METHOD FOR PRODUCING A STEEL COMPONENT PROVIDED WITH A COATING, AND STEEL COMPONENT

CROSS-REFERENCE TO RELATED APPLICATIONS

This application is a 371 U.S. National Stage of International Application No. PCT/EP2018/066264, filed Jun. 19, 2018, which claim priority to German Application No. 10 2017 211 076.7 filed Jun. 29, 2017. The disclosure of the above application is incorporated herein by reference in its entirety.

FIELD

The invention relates to a method for producing a steel component by forming of a flat steel product coated with an anticorrosion coating. The invention further relates to a steel component composed of a steel substrate coated with an anticorrosion coating.

BACKGROUND

The term "flat steel products" as presently used refers to steel strips, steel sheets, or blanks and the like that are obtained from them. Blanks are understood in general to be sheet-metal panels which may have more complex contours than the steel strips or steel sheets from which they originate.

Steels used in bodywork construction are subjected to exacting requirements in terms both of their mechanical properties and of their processing behavior. In order to be able to maximize the economics of processing, the steels employed are to have qualities including suitability for hot shaping, good weldability and good bondability. To meet the customer requirements for a long life, the bodywork parts used in vehicles are additionally intended to offer high resistance to corrosion. The latter quality may be achieved by application of an anticorrosion layer to the steel substrate.

For instance, coatings comprising substantially zinc are able to improve significantly the corrosion behavior of steel bodywork parts. However, blanks coated with zinc-based anticorrosion coatings can be processed only by indirect hot shaping, which represents an expensive operation. With indirect hot shaping, the blanks are first shaped at room temperature in a tool with high degrees of shaping, and only then, as a component, is heating carried out. The components are again inserted into a tool, in which they are brought with low degrees of shaping into their eventual form, in order to correct the component warping from the preceding treatment. Blanks coated with an aluminum-based anticorrosion coating, by contrast, are also suitable for processing by direct hot shaping. With direct hot shaping, the blanks are first heated in a furnace and then shaped hot in a tool with high degrees of shaping. Renewed shaping to correct the shape is unnecessary, and hence the overall operation is shortened.

WO 2008/053273 A1 discloses a process for producing a steel component provided with an aluminum-based anticorrosion coating. In this process, the blank to be shaped, coated with aluminum or an aluminum alloy, is heated at a rate of 4 to 12° C./s, held at temperatures of 880-940° C. for 3 to 13 minutes, then transferred to a shaping tool, shaped, and cooled at a rate of at least 30° C./s. After shaping has taken place, the coating of the component has a multiply layer construction with an interdiffusion layer, an intermediate layer, an intermetallic layer and a superficial layer. The interdiffusion layer consists of 86-95% Fe, 4-10% Al and up to 5% Si. The intermediate layer consists of 39-47% Fe, 53-61% Al and up to 2% Si. The intermetallic layer consists of 62-67% Fe, 30-34% Al and 2-6% Si. The superficial layer consists of 39-47% Fe, 53-61% Al and up to 2% Si. The component is said to have high weldability and crack resistance.

SUMMARY

The invention is based on the object of providing an improved method for producing a steel component provided with an anticorrosion coating. More particularly the invention is based on the object of providing a steel component provided with an anticorrosion coating and featuring high weldability and good bonding properties.

With regard to the method, this object is achieved by a method having the features specified in claim 1. Advantageous and preferred embodiments of the method of the invention are specified in the claims dependent from claim 1. With regard to the steel component, the object is achieved by a steel component having the features stated in claim 11. Advantageous and preferred embodiments of the steel component of the invention are specified in the claims dependent from claim 11.

In a method of the invention for producing a steel component coated with anticorrosion coating, first a flat steel product is provided that bears an aluminum-based anticorrosion coating.

The steel material used for the steel substrate of the flat steel product may typically comprise a fully killed steel with the following composition: 0.10-0.25 wt % of C, 1.0-1.4 wt % of Mn, 0.35-0.4 wt % of Si, up to 0.03 wt % of P, up to 0.01 wt % S, up to 0.040 wt % of Al, up to 0.15 wt % of Ti, up to 0.1 wt % of Nb, up to 0.005 wt % B, up to 0.5 wt % of Cr, up to 0.5 wt % of Mo, the sum of the amounts of Cr and Mo being at most 0.5 wt %, the balance being iron and unavoidable impurities.

Figures given presently for alloy contents and compositions are based on the weight or the mass, unless expressly indicated otherwise.

The aluminum-based anticorrosion coating is applied by means of conventional coating methods, such as hot dip coating, for example, to a steel substrate, which may be a steel sheet or steel strip, for example. A melt bath suitable for this purpose contains typically 3-15 wt % of silicon (Si), preferably 9-10 wt % of Si, and up to 3.5 wt % of iron, the balance being aluminum and unavoidable impurities. References presently to a steel component or flat steel product coated with an anticorrosion coating are to a steel component or flat steel product coated at least on one side.

The aluminum-based anticorrosion coating applied on the flat steel product contains typically 3-15 wt % of silicon, preferably 7-12 wt % of Si, more preferably 9-10 wt % of Si, and also up to 3.5 wt % of iron (Fe), preferably 1-3.5 wt % of Fe, more preferably 2-3.5 wt % of Fe, the balance being aluminum and unavoidable impurities. The thickness of the anticorrosion coating applied on the flat steel product is typically 10-40 μm per side, the add-on weight typically 30-100 g/m² per side, preferably 40-80 g/m² per side.

A blank is generated in a conventional way from the coated flat steel product and is subjected to a heat treatment. For the heat treatment, the coated blank of thickness d is inserted for a dwell time t into a furnace of furnace length L which has a furnace temperature T. The dwell time t here is the time which elapses between the insertion of the blank into and the discharge of the blank from the furnace. The blank thickness d is understood here to be the total thickness of the blank including the anticorrosion coating, in other words the sum of the thickness of the steel substrate and of the anticorrosion coating.

Studies have revealed that not only the welding properties but also the bonding properties are influenced by the blank thickness d, the dwell time t, the furnace length L and the furnace temperature T. In accordance with the invention, therefore, according to equation (1), the quotient Q of the product to the furnace temperature T in ° C. and the blank thickness d in mm to the product of the dwell time of the blank in the furnace t in min and the furnace length L in m, is at least 0.0034° C./min and at most 0.021° C./min: 0.0034° C./min≤Q≤0.021° C./min (1) with Q=(T*d)/(t*L), where T=furnace temperature in ° C., d=blank thickness in mm, t=dwell time of the blank in the furnace in min, L=furnace length in m The establishment of the heat treatment according to equation (1) in accordance with the invention is especially important for the diffusion of the iron from the steel substrate into the anticorrosion coating and therefore for the metallurgical bonding of the anticorrosion coating. At the same time, Q is selected so as to ensure operational reliability, by preventing liquefication of the anticorrosion coating during the heat treatment, liquid constituents during the shaping in the shaping tool, sticking of the anticorrosion coating on the furnace rollers, and attachment of the anticorrosion coating to transport devices and on the shaping tool.

At values for Q of less than 0.0034° C./min, an excessively high iron fraction of more than 60 wt % comes about in the low-silicon sublayer A of the anticorrosion coating, which is deleterious to the anticorrosion behavior of the coating. In particular, the accumulations of iron that occur on the surface of the anticorrosion coating at relatively low values of Q lead to red rust even under low corrosive challenges. It has been found, furthermore, that at values of Q of less than 0.0034° C./min, there is pronounced diffusion of iron atoms and manganese atoms from the steel substrate into the anticorrosion coating, which promotes the formation of porous oxide layers on the surface of the anticorrosion coating. Accordingly, oxide layers enriched with oxides of manganese and/or of iron are formed, with a thickness of greater than 250 nm and with pronounced porosity, thereby detracting from the electrical conductivity and hence the weldability. At the same time, a porous oxide layer on the surface of the component impairs paint adhesion and bonding adhesion. The latter may under load lead to premature failure.

At values of Q which are greater than 0.021° C./min, there is an increased risk of instances of caking and adhesion of the surface of the coating blank on the shaping tool, leading to adverse effects on the surface nature of the shaped component and also to increased tool wear. At values of Q which are greater than 0.021° C./min, furthermore, aluminum erosion is observed to an increased extent within the furnace, on the furnace rollers, and on the finished component this may lead locally to thicknesses which fail to meet the minimum coating thickness required by the customer.

Moreover, at values of Q which are greater than 0.021° C./min, the diffusion of iron into the layer A is not sufficiently promoted, and so less than 40 wt % of iron is present in the layer A. This impairs the welding properties of the shaped component, since the lower iron fraction raises the electrical resistance of the layer A.

In one preferred version, the furnace temperature T is set such that it is not less than 830° C. and not more than 980° C. Preferred in this context are furnace temperatures of at most 910° C., since such furnace temperatures allow steel components having particularly good bonding properties to be generated.

In a further preferred version, the dwell time t of the blank in the furnace is at least 1 and at most 18 minutes. The blank is typically inserted into the furnace at room temperature, and so the dwell time t may comprise both a heating phase and a holding phase.

A heat treatment at furnace temperatures T of 830° C. to 980° C. and/or with a dwell time t of 1 to 18 minutes have proven particularly suitable for the treatment of steel substrates which comprise 0.10-0.25 wt % of C, 1.0-1.4 wt % of Mn and 0.35-0.4 wt % of Si, up to 0.03 wt % of P, up to 0.01 wt % of S, up to 0.040 wt % of Al, up to 0.15 wt % of Ti, up to 0.1 wt % of Nb, up to 0.005 wt % of B, up to 0.5 wt % of Cr, up to 0.5 wt % of Mo, the sum of the amounts of Cr and Mo being at most 0.5 wt %, the balance being iron and unavoidable impurities.

The method of the invention is suitable especially for flat steel products having a thickness of 0.6-3.5 mm, for producing steel components having good weldability and good bonding adhesion.

The method of the invention has proven, surprisingly, to be particularly suitable for furnace lengths of 20-50 m. In shorter furnaces there is an increased risk of separation of the anticorrosion coating from the steel substrate. With furnace lengths of greater than 50 m, furnace roller fouling may occur to an increased extent, thereby impairing the surface quality of subsequent blanks.

The heat treatment takes place preferably as a continuous heat treatment in a continuous furnace.

In a further preferred version, the blank is moved through the furnace with an average velocity vP of at least 1.5 m/min and at most 25 m/min. vP is the average velocity at which the blank is transported from the furnace entrance to the furnace exit. It is also referred to as average blank velocity.

Average blank velocities of 1.5-25 m/min have proven particularly suitable when employing the method of the invention in furnaces 20-50 m in length.

If the blank is moved through the furnace with an average velocity of at least 1.5 m/min, this reduces the risk of attachments of the anticorrosion material to the furnace rollers. Moreover, at relatively low average blank velocities, there is an increased risk of unwanted layers forming, since the core temperature of the anticorrosion coating takes on the furnace temperature at an early stage, thereby boosting in particular the diffusion of iron and manganese from steel substrate into the outer layers of the coating, thus hindering the formation of an anticorrosion layer of the invention. The formation of an unwanted oxide layer on the surface is promoted as well, to the detriment of the welding properties. Moreover, an undesirably large quantity of iron diffuses into the anticorrosion coating, which increases the likelihood of red rust forming on the finished component.

If the blank is transported through the furnace with an average velocity quicker than 25 m/min, there is an increased risk of paint adhesion damage, because too little iron is able to diffuse to the surface onto the surface of the anticorrosion coating and, in the case of a phosphating treatment prior to painting, none of the phosphate crystals needed for effective paint adhesion are formed. In particular, the iron content of the first Si-rich layer Si1, of at least 40 wt %, can in that case no longer be reliably established. Furthermore, operational reliability is adversely affected, because the anticorrosion coating may have a viscous consistency in the shaping too. Furthermore, there is an increased risk of formation of elevated liquid-phase fractions of the anticorrosion coating in the furnace, which promotes the fouling of the furnace rollers. An increased proportion of liquid phase in this case is understood to be even a fraction of greater than or equal to 2% by volume of liquid phase in the anticorrosion coating. For flat steel products which are intended for hot shaping with press hardening, high average blank velocities of more than 25 m/min, depending on the composition of the steel substrate, mean that it is not possible to ensure that the core temperature of the steel substrate is heated over its entire thickness to temperatures above the conversion temperature Ac3, this being a prerequisite for complete through-curing.

It has emerged that good welding properties can be achieved particularly reliably if the average blank velocity is 2-17 m/min. This applies particularly to blanks having a thickness d of less than 1.5 mm. For blanks having a thickness d of at least 1.5 mm, average blank velocities of 2-8.4 m/min have proven particularly favorable.

In one particularly preferred version, the average blank velocity vP is constant during passage through the furnace, in order to reduce fluctuations in the quality of the anticorrosion coating.

After the heat treatment, the blank is discharged from the furnace and thereafter inserted into a shaping tool, in which the blank is shaped to form a steel component.

In one preferred version, the blank is subjected to hot shaping in the shaping tool. In order to avoid substantial losses of heat, the transfer time between furnace and shaping tool is typically at most 10 seconds.

The blank may optionally be cooled in the shaping tool, during shaping, at cooling rates of 20-1000 K/s, preferably 25-500 K/s, in order, for example, to harden the steel substrate.

The steel component thus generated comprises a steel substrate and also, at least on one side of the steel substrate, an anticorrosion coating. Also conceivable are systems wherein further coatings are applied to the anticorrosion coating. In one preferred version, however, the steel component generated consists of a steel substrate and of an anticorrosion coating applied at least on one side to the steel substrate.

Because of the heat treatment in operating step b), there is a change in the composition of the anticorrosion coating. The anticorrosion coating on the steel component that is present after the heat treatment is enriched by diffusion with, in particular, iron atoms. Enrichment of the anticorrosion coating with manganese atoms from the steel substrate is likewise possible. Furthermore, procedures according to the invention change the distribution of silicon atoms in the anticorrosion coating of the steel substrate, enabling a distinction to be made between multiple sublayers with different compositions.

The anticorrosion coating of the steel component comprises at least four sublayers, located one above another as viewed from the surface toward the steel substrate:

a first silicon-rich layer Si1 which besides unavoidable impurities contains more than 4 and up to 8 wt % of Si, 40-70 wt % of Fe, up to 1 wt % of Mn and 30-60 wt % of aluminum, the sum of the constituents present being 100 wt %, and which is located above the first low-silicon layer A, a first low-silicon layer A which besides unavoidable impurities contains 1-4 wt % of Si, 30-60 wt % of Fe, up to 1 wt % of Mn and 40-60 wt % of aluminum, the sum of the constituents present being 100 wt %, and which is located between a first silicon-rich layer Si1 and a second silicon-rich layer Si2, a second silicon-rich layer Si2 which besides unavoidable impurities contains more than 4 wt % and up to 8 wt % of Si, 40-70 wt % of Fe, up to 1 wt % of Mn and 20-50 wt % of aluminum, the sum of the constituents present being 100 wt %, and which is located between the first low-silicon layer A and the second low-silicon layer B, a second low-silicon layer B which besides unavoidable impurities contains 0.5-4 wt % of Si, 40-97 wt % of Fe, 0.5-1.5 wt % of Mn and 2-40 wt % of aluminum, the sum of the constituents present being 100 wt %, and which borders the steel substrate.

Good welding properties on the part of the steel component are obtained if the ratio X of the thickness dB of the second low-silicon layer B in μm to the thickness dA of the first low-silicon layer A in μm is at least 0.4 and at most 1.1: $0.4 \leq X \leq 1.1$ (2) with X=dB/dA, where dB=thickness of the low-Si layer B in μm and dA=thickness of the low-Si layer A in μm.

Surprisingly it has been found that the presence of the Si-rich layers Si1 and Si2 also has a positive influence on the welding properties and especially on the bonding properties of the steel components of the invention. Particularly good bonding properties are manifested in particular in anticorrosion coatings wherein at least one of the Si-rich layers has an Si content of at least 5 wt %.

The Fe fraction of the sublayer A is at least 30 wt %, preferably at least 40 wt %, in order to ensure good weldability of the anticorrosion coating.

The Al fraction of the sublayer B is at least 2 and at most 40 wt %, in order to ensure good bonding properties, especially good bonding adhesion, and also good welding properties. This can be achieved with particular reliability if the Al fraction of the layer B is limited to at least 5 and at most 20 wt % of Al.

In a further preferred version, the Si-rich layers Si1 and Si2 each have a higher iron fraction than the low-Si layer A. This has positive consequences for the attachment of paint to the finished component, since it promotes the phosphating operation typically preceding the painting operation.

Above the first Si-rich layer Si1 there may be further sublayers of the anticorrosion coating. For example, on its surface, the anticorrosion coating of the steel component has a thin layer enriched with silicon oxides and/or aluminum oxides. This outermost layer is also called the oxide layer (Ox) and may already be present after the coating operation and even before the heat treatment in operating step b), in a thickness of typically around 5 nm. During the heat treatment which is carried out before the shaping operation, in other words during operating step b), there may be an enrichment of the outermost layer with silicon oxides and aluminum oxides. The oxide layer may grow as a result of the heat treatment to typically 50 to 250 nm thickness. When the production method is employed in accordance with the invention, the thickness of the oxide layer after the treatment in operating step b) is at most 250 nm, preferably at most 150 nm. If the production process is employed not in accordance with the invention, the oxide layer grows to thicknesses of greater than 250 nm and, as well as silicon oxides and aluminum oxides, includes iron oxides and manganese oxides to an increased extent, leading to a layer of higher porosity. Relatively thick oxide layers, and also oxide layers interspersed with iron oxides and manganese oxides, have adverse effects on the welding and joining properties.

In certain cases, especially at furnace temperatures T of 880-920° C. and dwell times t of the blank in the furnace of 3-8 minutes, a further, low-silicon layer (C) may form above the silicon-rich layer Si1. This layer (C) besides unavoidable impurities, contains up to 4 wt % of Si, 30-60 wt % of Fe, up to 1 wt % of Mn and 30-60 wt % of aluminum and is located between the silicon-rich layer Si1 and the outermost layer Ox.

The layer thicknesses may be determined indirectly by means of low discharge optical emission spectroscopy (GDOES). GDOES measures as the weight percentages of the individual elements over the layer thickness. For this technique, samples are cut and cleaned with n-heptane. The samples thus prepared are placed into a glow discharge spectroscope and measured over the layer thickness with a resolution of 10 nm. Using this technique it is possible to measure the weight percentages of the individual elements over the entire thickness of the anticorrosion coating. Because of the difference in Si content of the low-Si layers A and B in comparison to the Si-rich layers Si1 and Si2 surrounding them, it is possible to ascertain the borders between the low-Si and the Si-rich layers and hence the thicknesses of the low-Si layers A and B. The border between a low-Si layer and an Si-rich layer is specified as soon as the GDOES profile indicates a measurement point having an Si content above 4 wt % of Si. Measurement points with values above 4 wt % of Si are assigned to an Si-rich layer; measurement points having values of less than or equal to 4 wt % of Si are assigned to a low-Si layer. The measurement values of the measurement points measured within the individual layers are arithmetically averaged per layer and so give the weight fraction of an element per layer. The layer thicknesses can in principle also be determined by optical microscopy. For that purpose, sections are polished and etched with 3% Nital solution. Under the optical microscope, Si-rich layers appear darker than low-Si layers on bright-field viewing and with a magnification of 1000 times.

Typical thicknesses of the individual sublayers measured by GDOES are 3-16 μm for the low-Si layer A, 2-15 μm for the low-Si layer B, 0.5-1.5 μm each for the Si-rich layers Si1 and Si2, and 2-12 μm for the optional low-Si layer C.

BRIEF DESCRIPTION OF FIGURES

The invention is elucidated in more detail below with exemplary embodiments and drawings.

DETAILED DESCRIPTION

Figure 1:
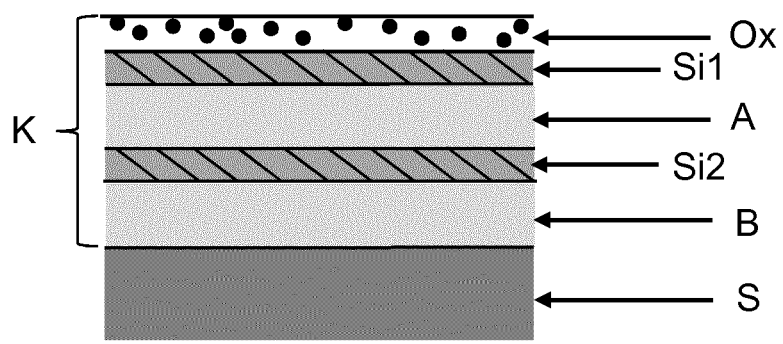
FIG. 1 shows schematically the structure of a first embodiment of an anticorrosion coating of the invention.

A structure typical when performing the method in accordance with the invention, of the anticorrosion coating lying on the heat-treated flat steel product shaped to form the steel component, and hence also lying on the shaped steel component, is shown in FIG. 1. In a first embodiment of an anticorrosion coating of the invention, the anticorrosion coating K lies on the steel substrate S. The anticorrosion coating K consists of five sublayers: an oxide-enriched layer Ox, which as the outermost layer has contact with the surrounding atmosphere, a first Si-rich layer Si, which lies between the oxide layer Ox and a first low-Si layer A, a first low-Si layer A, which lies between the first Si-rich layer Si1 and a second Si-rich layer Si2, a second Si-rich layer Si2, which lies between the layer A and a second low-Si layer B, and a second low-Si layer B, which lies below the second Si-rich layer Si2 and lies directly on the steel substrate S.

Figure 2:
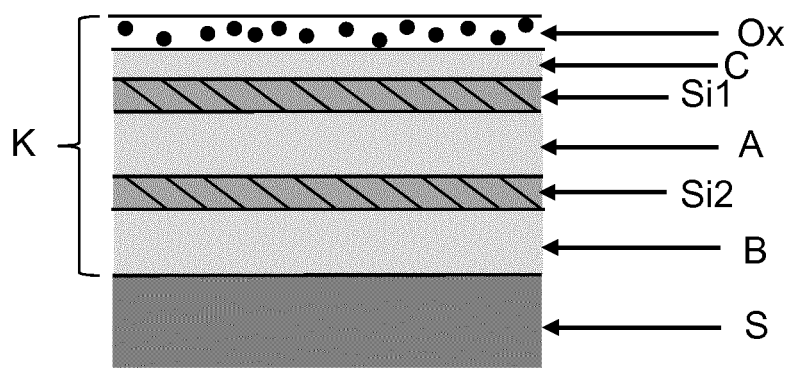
FIG. 2 shows schematically the structure of a second embodiment of an anticorrosion coating of the invention.

FIG. 2 likewise shows a schematic structure of an anticorrosion coating of the invention, in which additionally there is a further low-Si layer C formed between the oxide layer Ox and the first Si-rich layer Si2.

To demonstrate the effect of the invention, ten trials were conducted. For these trials, steel sheets hot dip coated on either side were used, with the compositions specified in Table 1 for the steel substrate and with the compositions specified in Table 2 for the anticorrosion coatings. The anticorrosion coatings were applied to the steel substrates in a conventional way by hot dip coating. Cold-rolled steel strips were used in each case, and after coating were plated down into steel sheets. Blanks were cut from the steel sheets, and were heat-treated under the conditions specified in Table 3. Following the heat treatment, the blanks were each taken from the heat treatment furnace, inserted within 7 s into a shaping tool, and shaped in a conventional way to form components.

After shaping had taken place, samples were taken from the components, and were used to determine the element distribution in the anticorrosion coatings, by means of glow discharge optical emission spectroscopy. Table 4 reports the layer structure of the anticorrosion coatings, the thicknesses dA and dB of the sublayers A and B, and the resultant value X. The total thicknesses of the anticorrosion coatings after the heat treatment are between 20 and 55 μm. Samples 1, 2, 4, 5, 9 and 10 have a layer structure according to FIG. 1. In these samples, the anticorrosion coating consists in each case of an oxide layer Ox, beneath which there is first a first Si-rich layer Si1, then a first low-Si layer A, then a second Si-rich layer Si2, and then a second low-Si layer B. Samples 3, 6, 7 and 8 have a layer structure according to FIG. 2. In these samples, the anticorrosion coating between the oxide layer Ox and the first Si-rich layer Si1 has a further, low-Si layer C. The compositions of the sublayers Si1, Si2, A, B and, for the samples 3, 6, 7 and 8, of the sublayer C of the anticorrosion coatings, resulting after the heat treatment, are reported in Table 5. In all the samples the outermost sublayer of the anticorrosion coating is an oxide layer. The thicknesses of these oxide layers are between 70 and 135 nm.

From the components, samples were also taken for testing the welding behavior, samples for testing the bonding properties, and samples for testing the paint attachment. The welding behavior was examined in accordance with SEP 1220-2, in the version of 2011. Good welding behavior is shown by values for the welding range that are at least 0.9 kA.

The bonding properties were tested in accordance with SEP 1220-6, in the provisional version of August 2016. The adhesive used was Betamate 1485 S from DOW Chemical. The samples were pulled apart to breaking. To evaluate the bonding behavior, evaluations were made of the nature of the fracture area and the fracture forces employed. Bonding behavior is good if the lap shear strength is at least 30 MPa and the fracture area extends substantially on the surface of the anticorrosion coating. Bonding behavior is good especially when at least 75%, more particularly at least 85% of the fracture area lies within the oxide layer on the surface. Fracture area components in other sublayers of the coating or in the adhesive are undesirable.

To test the paint attachment, the cross-cut index was determined in accordance with DIN EN ISO 20567-1B+C. Permissible cross-cut indices in this test are the values of GT0, GT1 and GT2. Cross-cut indices of GT0 and GT1 are considered a measure of particularly good paint attachment.

The results of the investigations on welding behavior, on bonding behavior and on paint attachment are reported in Table 6. From Table 6 it can be seen that all the samples have good welding behavior, with welding ranges of at least 1 kA. The bonding test samples all tear substantially in the oxide layer in the corrosion coating. Hence all the samples exhibit good bonding behavior, with fracture area fractions in the oxide layer of at least 75 area % and lap shear strengths of at least 30 MPa. Paint attachment is likewise good for all the samples. Thus all the samples show cross-cut indices of GT0 to GT2.

TABLE 1

| Steel | C | Si | Mn | P | S | Al | Nb | Ti | B |
|---|---|---|---|---|---|---|---|---|---|
| A | 0.2 | 0.38 | 1.2 | 0.02 | 0.009 | 0.015 | — | 0.05 | 0.005 |
| B | 0.23 | 0.35 | 1.1 | 0.023 | 0.010 | 0.012 | — | 0.045 | 0.004 |
| C | 0.215 | 0.37 | 1.25 | 0.022 | 0.008 | 0.013 | — | 0.047 | 0.005 |
| D | 0.23 | 0.35 | 1.35 | 0.02 | 0.008 | 0.010 | — | 0.04 | 0.004 |
| E | 0.09 | 0.30 | 0.09 | 0.028 | 0.023 | 0.010 | 0.08 | 0.013 | 0.004 |

Balance iron and unavoidable impurities. Figures in each case in wt %

TABLE 2

| Coating | Si | Fe |
|---|---|---|
| Z1 | 9.5 | 3 |
| Z2 | 8 | 3.5 |
| Z3 | 10 | 3 |

Balance aluminum and unavoidable impurities. Figures in each case in wt %

TABLE 3

| Trial # | Steel | Coating | Add-on weight per side [g/m²] | d [mm] | T [° C.] | t [min] | L [m] | Q [° C./min] | vP [m/min] |
|---|---|---|---|---|---|---|---|---|---|
| 1 | A | Z1 | 35 | 0.81 | 920 | 1.7 | 28 | 0.0153 | 16.47 |
| 2 | A | Z3 | 55 | 1.22 | 930 | 3 | 25 | 0.0151 | 8.33 |
| 3 | B | Z2 | 72 | 1.53 | 920 | 3.5 | 30 | 0.0134 | 8.57 |
| 4 | B | Z2 | 70 | 2.85 | 925 | 7 | 30 | 0.0126 | 4.28 |
| 5 | C | Z1 | 80 | 1.02 | 890 | 2.75 | 25 | 0.0132 | 9.09 |
| 6 | C | Z3 | 40 | 1.48 | 910 | 5 | 25 | 0.0108 | 5 |
| 7 | D | Z1 | 73 | 1.12 | 910 | 5.5 | 30 | 0.0062 | 5.45 |
| 8 | E | Z2 | 80 | 1.35 | 920 | 4.5 | 25 | 0.0110 | 5.55 |
| 9 | C | Z1 | 69 | 1.48 | 925 | 6 | 25 | 0.0091 | 4.16 |
| 10 | B | Z1 | 72 | 1.52 | 925 | 3 | 25 | 0.0187 | 8.33 |

The add-on weight is based on the add-on weight before the heat treatment

TABLE 4

| Trial # | Layer structure | dA [µm] | dB [µm] | X |
|---|---|---|---|---|
| 1 | Ox—Si1-A-Si2—B | 9 | 6.6 | 0.73 |
| 2 | Ox—Si1-A-Si2—B | 8.5 | 6 | 0.71 |
| 3 | Ox—C-Si1-A-Si2—B | 14.6 | 10.2 | 0.70 |
| 4 | Ox—Si1-A-Si2—B | 12.6 | 10.8 | 0.86 |
| 5 | Ox—Si1-A-Si2—B | 11.2 | 11.6 | 1.04 |
| 6 | Ox—C-Si1-A-Si2—B | 7 | 5.2 | 0.74 |
| 7 | Ox—C-Si1-A-Si2—B | 14.4 | 11 | 0.76 |
| 8 | Ox—C-Si1-A-Si2—B | 15.8 | 8.6 | 0.54 |
| 9 | Ox—Si1-A-Si2—B | 13.1 | 11.2 | 0.85 |
| 10 | Ox—Si1-A-Si2—B | 7.9 | 8.1 | 1.03 |

TABLE 5

| | Sublayer Si1 | | | | Sublayer Si2 | | | | Sublayer A | | | | Sublayer B | | | | Sublayer C | | | |
|---|---|---|---|---|---|---|---|---|---|---|---|---|---|---|---|---|---|---|---|---|
| Trial # | Si | Al | Fe | Mn | Si | Al | Fe | Mn | Si | Al | Fe | Mn | Si | Al | Fe | Mn | Si | Al | Fe | Mn |
| 1 | 4.8 | 40 | 54 | 0.4 | 5.5 | 33 | 60 | 0.8 | 2.5 | 50 | 46 | 0.5 | 3 | 11 | 84 | 1.1 | — | — | — | — |
| 2 | 6.6 | 35 | 57 | 0.8 | 6.2 | 29 | 63 | 0.8 | 3 | 46 | 50 | 0.5 | 2.8 | 9 | 86 | 1.2 | — | — | — | — |

TABLE 5-continued

| Trial # | Sublayer Si1 | | | | Sublayer Si2 | | | | Sublayer A | | | | Sublayer B | | | | Sublayer C | | | |
|---|---|---|---|---|---|---|---|---|---|---|---|---|---|---|---|---|---|---|---|---|
| | Si | Al | Fe | Mn | Si | Al | Fe | Mn | Si | Al | Fe | Mn | Si | Al | Fe | Mn | Si | Al | Fe | Mn |
| 3 | 4 | 32 | 63 | 0.7 | 4.3 | 21 | 73 | 0.7 | 1.8 | 40 | 57 | 0.6 | 2.1 | 10 | 86 | 0.9 | 1.5 | 46 | 50 | 0.5 |
| 4 | 5.4 | 44 | 49 | 0.6 | 5.8 | 31 | 62 | 0.7 | 3.1 | 50 | 46 | 0.4 | 3.3 | 12 | 83 | 1.1 | — | — | — | — |
| 5 | 6.3 | 36 | 56 | 0.7 | 5.7 | 25 | 68 | 0.8 | 2.6 | 47 | 49 | 0.5 | 2.8 | 7 | 89 | 1.05 | — | — | — | — |
| 6 | 5 | 45 | 49 | 0.6 | 6.3 | 31 | 61 | 0.7 | 2.4 | 53 | 44 | 0.4 | 3.1 | 12 | 83 | 1 | 4.0 | 46 | 49 | 0.5 |
| 7 | 6 | 40 | 53 | 0.8 | 5.8 | 29 | 64 | 0.7 | 3.5 | 47 | 48 | 0.5 | 2.9 | 9.5 | 86 | 1.1 | 4.0 | 43 | 52 | 0.7 |
| 8 | 6.7 | 43 | 49 | 0.8 | 5.9 | 34 | 59 | 0.9 | 3.5 | 50 | 45 | 0.5 | 3.0 | 10 | 85 | 1.1 | 4.0 | 47 | 48 | 0.8 |
| 9 | 5.4 | 45 | 48 | 0.7 | 5.4 | 35 | 58 | 0.7 | 3.1 | 48 | 48 | 0.4 | 3.3 | 20 | 75 | 1.1 | — | — | — | — |
| 10 | 6.5 | 48 | 44 | 0.6 | 5.7 | 48 | 45 | 0.9 | 3.4 | 50 | 45 | 0.6 | 3.1 | 11 | 84 | 1.0 | — | — | — | — |

Figures in each case in wt %. Balance unavoidable impurities.

TABLE 6

| Trial # | Welding range [kA] | Fracture area fraction (fracture area on the surface) [area %] | Lap shear strength [MPa] | Cross-cut index |
|---|---|---|---|---|
| 1 | 1.0 | 78 | 34 | GT 1 |
| 2 | 1.1 | 85 | 36 | GT 0 |
| 3 | 1.1 | 75 | 32 | GT 0 |
| 4 | 1.2 | 75 | 31 | GT 1 |
| 5 | 1.0 | 87 | 41 | GT 1 |
| 6 | 1.1 | 80 | 40 | GT 0 |
| 7 | 1.1 | 85 | 43 | GT 0 |
| 8 | 1.3 | 79 | 37 | GT 0 |
| 9 | 0.9 | 75 | 30 | GT 1 |
| 10 | 1.0 | 78 | 32 | GT 2 |

What is claimed is:

1. A method for producing a steel component coated with an anticorrosion coating, comprising the following operating steps:
   a) providing a flat steel product coated with an aluminum-based anticorrosion coating,
   b) heat-treating a blank formed from the coated flat steel product, in a furnace, where:

$$0.0034° \text{ C./min} \leq Q \leq 0.021° \text{ C./min}$$

with $Q=(T*d)/(t*L)$, where
   T=furnace temperature in ° C.,
   d=blank thickness in mm,
   t=dwell time of the blank in the furnace in min,
   L=furnace length in mm; and
   c) shaping the blank in a shaping tool to form a steel component,
   wherein said heat treating step changes the composition of the aluminum-based anticorrosion coating such that the aluminum-based anticorrosion coating includes a first silicon-rich layer, which contains more than 4 and up to 8 wt % of Si, that is the outermost layer of the aluminum-based anticorrosion coating.

2. The method as claimed in claim 1, wherein the temperature T of the furnace is at least 830° C. and at most 980° C.

3. The method as claimed in claim 2 wherein the blank is moved through the furnace during operating step b) with an average velocity (vP) of at least 1.5 m/min and at most 25 m/min.

4. The method as claimed in claim 1 wherein the dwell time t of the blank in the furnace is at least 1 min and at most 18 min.

5. The method as claimed in claim 1 wherein the aluminum-based anticorrosion coating contains 3-15 wt % of silicon, up to 3.5 wt % of iron, the balance being aluminum and unavoidable impurities.

6. The method as claimed in claim 1 wherein the Si content of the aluminum-based anticorrosion coating is 7-12 wt %.

7. The method as claimed in claim 1 wherein the Si content of the aluminum-based anticorrosion coating is 9-10 wt %.

8. The method as claimed in claim 1 wherein the Fe content of the aluminum-based anticorrosion coating is 1-3.5 wt %.

9. The method as claimed in claim 1 wherein that the Fe content of the aluminum-based anticorrosion coating is 2-3.5 wt %.

10. The method as claimed in claim 1 wherein the blank is cooled in operating step c) in the forming tool at a cooling rate (CR) of at least 20 K/s and at most 1000 K/s.

11. The method of claim 1, wherein said heat treating step changes the composition of the aluminum-based anticorrosion coating to further include:
   a second silicon-rich layer, which contains more than 4 and up to 8 wt % of Si, disposed between the first silicon-rich layer and the flat steel product;
   a first low silicon layer, which contains 1-4 wt % of Si, disposed between the first and second silicon-rich layers; and
   a second low silicon layer, which contains 0.5-4 wt % of Si, disposed between the second silicon-rich layer and the flat steel product.

12. The method of claim 11, wherein:
   the first silicon-rich layer, which besides unavoidable impurities, further contains 40-70 wt % of Fe, up to 1 wt % of Mn and 30-60 wt % of aluminum;
   the first low-silicon layer, which besides unavoidable impurities, further contains 30-60 wt % of Fe, up to 1 wt % of Mn and 40-60 wt % of aluminum;
   the second silicon-rich layer, which besides unavoidable impurities, further contains 40-70 wt % of Fe, up to 1 wt % of Mn and 20-50 wt % of aluminum; and
   the second low-silicon layer, which besides unavoidable impurities, further contains 40-97 wt % of Fe, 0.5-1.5 wt % of Mn and 2-40 wt % of aluminum.

13. The method of claim 12, wherein said heat treating step changes the composition of the aluminum-based anticorrosion coating to further include a third low-silicon layer, which contains 0-4 wt % Si, disposed on the first silicon-rich layer such that the third low-silicon layer is the outermost layer of the anticorrosion coating instead of the first silicon-rich layer.

14. The method of claim 12, wherein the heat treating step changes the composition of the aluminum-based anticorrosion coating to further include an oxide layer containing silicon oxides and/or aluminum oxides having a thickness of between 50 nm and 250 nm,
 wherein the oxide layer is the outermost layer of the anticorrosion coating instead of the first silicon-rich layer, and
 wherein a ratio X of a thickness (dB) of the second low-silicon layer in μm to a thickness (dA) of the first low-silicon layer in μm is at least 0.4 and at most 1.1.

15. A method for producing a steel component coated with an anticorrosion coating, comprising the following operating steps:
 (a) providing a flat steel product coated with an aluminum-based anticorrosion coating,
 (b) heat-treating a blank formed from the coated flat steel product, in a furnace, to change the composition of the anticorrosion coating to produce:
  a first silicon-rich layer containing more than 4 and up to 8 wt % of Si, 40-70 wt % of Fe, up to 1 wt % of Mn and 30-60 wt % of aluminum;
  a second silicon-rich layer being disposed between the first silicon-rich layer and the flat steel product, and containing more than 4 and up to 8 wt % of Si, 40-70 wt % of Fe, up to 1 wt % of Mn and 20-50 wt % of aluminum;
  a first low silicon layer being disposed between the first and second silicon-rich layers, and containing 1-4 wt % of Si, 30-60 wt % of Fe, up to 1 wt % of Mn and 40-60 wt % of aluminum; and
  a second low silicon layer being disposed between the second silicon-rich layer and the flat steel product, and containing 0.5-4 wt % of Si, 40-97 wt % of Fe, 0.5-1.5 wt % of Mn and 2-40 wt % of aluminum; and
 (c) shaping the blank in a shaping tool to form a steel component.

* * * * *